No. 667,353. Patented Feb. 5, 1901.
G. L. WARNER.
COOKING UTENSIL.
(Application filed June 25, 1900.)
(No Model.)
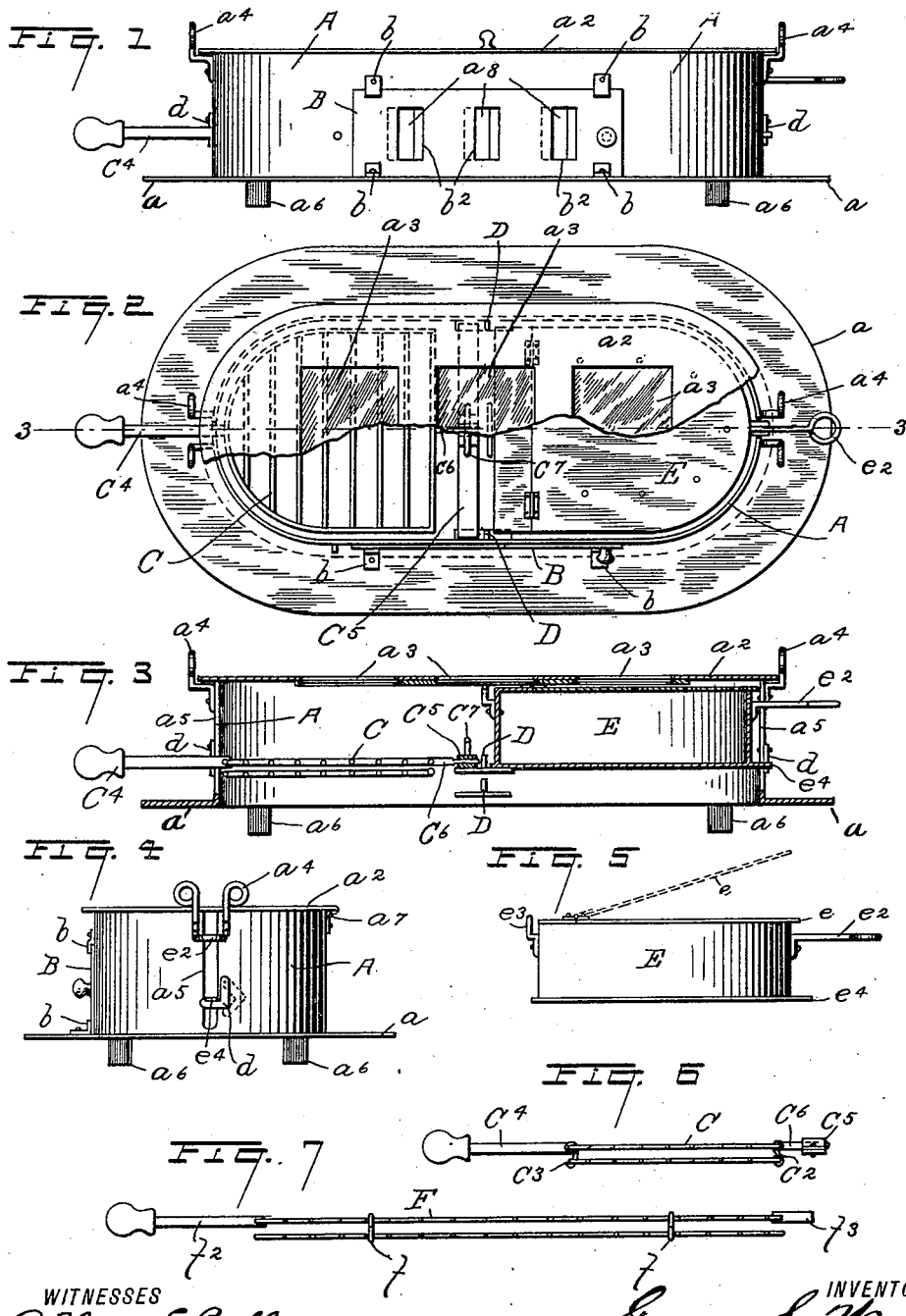
WITNESSES
INVENTOR
BY
ATTORNEYS

UNITED STATES PATENT OFFICE.

GEORGE L. WARNER, OF NEW YORK, N. Y.

COOKING UTENSIL.

SPECIFICATION forming part of Letters Patent No. 667,353, dated February 5, 1901.

Application filed June 25, 1900. Serial No. 21,493. (No model.)

*To all whom it may concern:*

Be it known that I, GEORGE L. WARNER, a citizen of the United States, residing at New York, in the county of New York and State of New York, have invented certain new and useful Improvements in Cooking Utensils, of which the following is a full and complete specification, such as will enable those skilled in the art to which it appertains to make and use the same.

This invention relates to cooking utensils for use in boiling, broiling, or stewing articles of food on a stove, range, or other heater; and the object thereof is to provide an improved device of this class which is simple in construction and operation and also comparatively inexpensive, and by means of which different articles of food may be broiled, boiled, or stewed at the same time or which may be used as a broiler only.

The invention is fully disclosed in the following specification, of which the accompanying drawings form a part, in which—

Figure 1 is a side view of my improved cooking utensil; Fig. 2, a plan view thereof when used as a broiler or saucepan, part of the cover being broken away; Fig. 3, a longitudinal section on the line 3 3 of Fig. 2; Fig. 4, an end view of the device; Fig. 5, a side view of the saucepan; Fig. 6, a side view of the broiler which is designed for use in connection with the saucepan, and Fig. 7 a side view of the broiler which is designed for use in the cooking utensil separately.

In the drawings forming part of this specification the separate parts of my improvement are designated by suitable reference characters, and in the practice of my invention I provide a device of the class specified which comprises an oblong casing A, the ends of which are rounded or segmental in form, and the casing A is provided with a bottom flange $a$ and a hinged cover $a^2$, in which are preferably placed transparent panels $a^3$, preferably composed of mica and through which the contents of the cooking utensil may be seen. The casing A is provided at each end with handles $a^4$, composed of two upwardly-directed parts, and between which at each end is a vertical slot or opening $a^5$, which extends almost or quite to the bottom of the casing A, and the bottom $a$ of the casing is provided with downwardly-directed lugs or projections $a^6$, which hold the utensil stationary on the top of a stove or range, it being understood that said top of the stove or range is provided with an opening similar in form to that of the cooking utensil into which the lugs or projections $a^6$ extend.

The cover $a^2$ is hinged at one side, as shown at $a^7$ in Fig. 4, and in one side of the casing A are formed openings $a^8$, three of which are shown in Fig. 1, and a slidable plate B is mounted in keepers $b$, secured to the side of the casing A and adapted to open or close the openings $a^8$ in the side of the casing A or to regulate the size of said openings, as may be desired, said plate B being provided with openings $b^2$, which correspond with the openings $a^8$, and which are adapted to register therewith or to close the same when necessary, and by means of this device the cooking utensil may be ventilated, as will be readily understood.

I also provide a broiler C, which is of the same shape as one end of the casing A and adapted to fit therein, and said broiler is preferably composed of open wirework and consists of two separate parts hinged together at one side, as shown at $C^2$ in Fig. 6, and adapted to be connected at the opposite side, as shown at $C^3$, by means of any suitable catch, and in practice the steak or other article to be broiled is placed between the separate parts of the broiler in the usual manner, and said broiler is provided at one end with a handle $C^4$, which when the broiler is placed in position in the casing A projects out through one of the slots $a^5$ in the end thereof, and the broiler C is provided at the end opposite the handle with a transverse spring-metal bar $C^5$, connected with the central portion of the inner end of the broiler by a finger $C^6$, rigidly secured to the broiler and adapted to turn in said transverse spring-metal bar $C^5$, or the said bar may turn on said finger.

The casing A of the cooking utensil is provided centrally of the inner side walls with two double L-shaped supports D, as shown in Figs. 2 and 3, one of which is placed directly over the other, and said casing is also provided at each end and adjacent to the vertical slots $a^5$ with a pivoted L-shaped catch $d$, said catches $d$ being in the same horizontal plane as the upper L-shaped supports D, the lower L-shaped supports D being in the same horizontal plane as the bottom of the slots $a^5$ in the ends of the casing A. The bar $C^5$ is also preferably provided at the middle portion thereof with a loop-shaped handle $C^7$, and in placing the broiler in position, as shown in Figs. 2 and 3, the ends of said bar are placed on one of the L-shaped supports D and the handle $C^4$ of the broiler is passed down through one of the slots $a^5$ in the end of the casing A, and if the upper support D is employed the clip or catch $d$ at said end of the casing A is turned down, as shown in Figs. 3 and 4, and supports the handle $C^4$ of the broiler parallel with the upper supports D, as shown in Fig. 3, and at a certain distance above the bottom of the casing A; but if it is desired to support the broiler nearer to the bottom of said casing the bar $C^5$ is placed on the lower supports D and the clip or catch $d$ turned so as to allow the handle $C^4$ to drop into the bottom of the slot $a^5$.

The saucepan which I employ is shown at E in Figs. 2, 3, and 5, is of the form of one end of the casing A, and is provided with a hinged cover $e$, and at one end with a handle $e^2$ and at the opposite end with a loop-shaped handle $e^3$, and said saucepan is adapted to be placed in the casing A exactly in the same manner as the broiler C, with the exception that the inner end of the bottom of the saucepan rests on one set of the supports D, and said saucepan is provided at its other or outer end with a lug or projection $e^4$, which passes through the corresponding slot $a^5$ in the casing A and may rest on the corresponding clip or catch $d$. The saucepan may be used for the same purpose as other devices of this class, and the contents thereof may be examined at any time by raising the cover of the casing A and the hinged cover $e$ of the saucepan.

With the broiler and the saucepan in position as shown in Fig. 3 my improved cooking utensil may be used for any or all of the purposes named at the same time, and in Fig. 7 I have shown at F a modified form of broiler which is designed to be used separately in the casing A, and in order to use which the broiler C and saucepan E must be removed from said casing.

The broiler F (shown in Fig. 7) is of the same form as the bottom of the casing A and designed to fit therein and is composed of two separate parts of wire or other open metalwork hinged together at $f$ and adapted to be connected at the opposite side in the usual manner, and one of said parts is provided at one end with a handle $f^2$ and at the opposite end with a pin or projection $f^3$, and in placing this device in the casing A the handle $f^2$ and the pin or projection $f^3$ are passed down through the vertical slots $a^5$ in the opposite ends of said casing, and this broiler may be turned within the casing whenever desired or necessary, the handle $f^2$ and the pin or projection $f^3$ serving as pivots for this purpose, and the said broiler F may also be supported on the catches or clips $d$ at the ends of said casing or in the bottom of the slots $a^5$, and the width of the broiler F is such that the L-shaped supports D, with which the inner side walls of the casing A are provided, do not interfere with the insertion or removal of said broiler.

My improved cooking utensil is simple in construction and operation and is perfectly adapted to accomplish the result for which it is intended and is also comparatively inexpensive and may be readily used by any one familiar with the operation of cooking utensils of this class.

Having fully described my invention, I claim as new and desire to secure by Letters Patent—

1. In a cooking utensil, an oblong casing adapted to be placed over a corresponding hole or opening in a stove or range, and provided at each end with a vertical slot which extends approximately to the bottom thereof, and with catches or clips pivoted to the ends thereof adjacent to said slots at a predetermined distance above the bottom thereof, said casing being also provided at the opposite sides and centrally thereof with separate sets of supports secured to the inner walls thereof, one set above the other, and a detachable broiler and a detachable saucepan, each of which is adapted to be placed in said casing and to be supported therein, and said broiler and said saucepan being together of the same general form of said casing and adapted to fill the same, and being each provided at its outer end with a handle, and said handles being adapted to be passed down through the end slots in the casing, substantially as shown and described.

2. A cooking utensil, comprising an oblong casing having a hinged cover, and provided with vertical slots or openings in the ends thereof and central interior supports, and a broiler adapted to be placed therein and provided at one end with a handle which projects through one of said slots or openings and at its opposite end with a transverse plate to which it is pivotally connected and which is adapted to rest upon the central interior supports, said broiler being adapted to be turned on its supports by means of said handle, substantially as shown and described.

3. In a device of the class described, an oblong casing provided with a hinged cover, and ventilating devices in one side thereof, said casing being also provided at its opposite ends with handles, and with vertical slots or openings, and adjacent to said vertical slots or openings and at a predetermined distance from the bottom thereof, with pivoted catches or clips, and the inner side walls of said casing being provided centrally thereof with separate sets of supports, one set being arranged above the other, and a broiler adapted to be placed in said casing, and provided at one end with a handle which passes outwardly through one of said slots or openings in the ends thereof and at the other end with a transverse bar to which it is pivotally connected, and said broiler being adapted to be supported at different altitudes in said casing by means of said supports and said catches or clips, substantially as shown and described.

In testimony that I claim the foregoing as my invention I have signed my name, in presence of the subscribing witnesses, this 21st day of June, 1900.

GEORGE L. WARNER.

Witnesses:
F. A. STEWART,
V. M. VOSLER.